United States Patent [19]

Chi et al.

[11] Patent Number: 5,607,983
[45] Date of Patent: Mar. 4, 1997

[54] FOAMABLE PLANT FIBER COMPOSITION AND THE FOAMED MATERIAL AND ARTICLE THEREOF

[76] Inventors: Hong Chi; Bai Lin, both of Faculty's Residence No. 9-12, Wuhan University of Hydraulic and Electric Engineering, Wuhan City, Hubei, 430072, China; To lai Chung, Unit 300, 3/F., Block B, Seaview Estate, 2-8 Watson Road, North Point, Hong Kong

[21] Appl. No.: 569,244

[22] PCT Filed: May 10, 1995

[86] PCT No.: PCT/CN95/00038

§ 371 Date: Dec. 22, 1995

§ 102(e) Date: Dec. 22, 1995

[87] PCT Pub. No.: WO95/30710

PCT Pub. Date: Nov. 16, 1995

[30] Foreign Application Priority Data

May 10, 1994 [CN] China ................................ 94105304.0

[51] Int. Cl.$^6$ ........................................................ C08J 9/08
[52] U.S. Cl. .................. 521/84.1; 106/122; 252/307; 252/315.3; 428/36.5; 428/317.1; 521/65; 521/68; 521/72

[58] Field of Search ................................ 521/84.1, 65, 68, 521/72; 106/122; 252/307, 315.3; 428/36.5, 317

[56] References Cited

FOREIGN PATENT DOCUMENTS

| 1080301 | 1/1994 | China . |
|---|---|---|
| 5-65359 | 3/1993 | Japan . |
| 6-32386 | 2/1994 | Japan . |

*Primary Examiner*—Morton Foelak
*Attorney, Agent, or Firm*—Ladas & Parry

[57] ABSTRACT

The present invention relates to a foamable plant fiber composition made from short plant fiber, plant fiber powder, gelling material, water, foaming agent and (if necessary) aids by a certain process, and the foamed material and shaped article thereof. The composition has a good processability, and the shaped article made from it is light, and is biodegradable without pollution. It can replace the plastics to make non-reused tablewares and cushioning materials, etc. the price of it is only one fifth that of the plastics ones.

11 Claims, No Drawings

FOAMABLE PLANT FIBER COMPOSITION AND THE FOAMED MATERIAL AND ARTICLE THEREOF

TECHNICAL FIELD

The present invention relates to a foamable plant fiber composition, the biodegradable foamed material and shaped article obtained by foaming the composition.

BACKGROUND ART

Currently widely-used non-reused packaging articles like fast food dinner-pail, the cushioning materials for various precision instruments, etc. are all made from plastics, such as foamed polystyrene, foamed polyvinyl chloride, foamed polyurethane foamed polyethylene, polyethylene and polypropylene, etc. As these articles are all non-reused and can remain in the nature rather stably without being decomposed, the enormous littering has been causing serious pollution to the nature. In addition, our living environment is further worsened as freon which can destroy ozone layer is used in the production of these articles, especially in the process of foaming.

Paper has also been used to produce packaging articles like tablewares, but it is reported that paper-based articles cause even more serious pollution to the nature than the plastic ones, and the overall resource consumed in making paper-based articles is much more than plastic articles, for example, the amount of the steam used to make a paper cup is 12 times that of a foamed polystyrene cup, electricity is 36 times, the cooling water is twice and the consumption of oil product materials is almost the same (see "The Situations and Outlook of Packaging Industry", "China Package" Magazine, Vol. 13, No. 3, P. 14, 1993).

The non-reused tablewares produced by pressing starch, corn and paint straw with binder are also disclosed. But such articles have a dense structure and a heavier weight, thus require large quantity of raw materials, besides, it is difficult to be shaped in mould, and need a long time to bake, therefore, not suitable for large scale production.

Accordingly, it is desired to have such a novel material which possesses me foamed plastics-like properties, in the meantime can avoid the foamed plastics disadvantage-polluting the environment because of not being decomposed, thus the material can be easily processed with low energy-consumption like the famed plastics and suits for industrial mass production, while it is totally harmless to environment from it's manufacturing, use till discard.

The present applicant's application CN 1080301A disclosed a nonpolluting foamed material obtained by a process comprising thoroughly blending a plant fiber material, a conventional poisonless and harmless gelling material and water, foaming and ripening after adding an appropriate amount of foaming agent and foaming aids, wherein the plant fiber material comprises mainly fiberous material of 1–3 mm long. Because the fiber used is relatively short, the mechanical strength of the material derived from the mixture of the fiber and pure starch as gelling material is very low, and can not be processed into articles. The gelling material with better gelling property such as polyvinyl alcohol, alginate etc. has to be added in order to improve the mechanical strength. Since these gelling materials are rather expensive, the cost of the articles made form them is increased.

DISCLOSURE OF THE INVENTION

The present invention is an improvement over the Chinese Patent Application CN 1080301A wherein the plant fiber is changed to lower the cost while maintaining the mechanical strength of the foamed material and shaped article.

One aspect of the present invention is to provide a foamable plant fiber composition used for preparation of a biodegradable foamed material and article, which is made from the following components by a certain process:

a) from 6.8 to 12.4 percent by weight of short plant fiber, b) from 6.2 to 17.0 percent by weight of plant fiber powder, c) from 8.5 to 12.0 percent by weight of gelling material, d) from 60 to 72 percent by weight of water, e) from 0.4 to 0.7 percent by weight of foaming agent, and if necessary f) from 0.8 to 1.3 percent by weight of aids, said process comprises adding the gelling material into the water, and then heating the mixture while stirring, adjusting the pH value to neutral after a semi-transparent colloid is formed, and adding the short plant fiber, plant fiber powder, foaming agent and, if necessary aids, then stirring and kneading thoroughly until the mixture is homogeneous.

Another aspect of the present invention is to provide a biodegradable foamed material which is obtained by forming the foamable plant fiber composition stated above by any conventional process and removing the residual water as much as possible.

Another aspect of the present invention is to provide a biodegradable foamed shaped article, which is obtained by foaming the foamable plant fiber composition stated above in mould by any process and removing the residual water as much as possible.

The present invention is described in mare detail in the following.

Both the short plant fiber and the plant fiber powder which may be used in the present invention can be made from the fiber of various herbaceous plants and xylophyta, such as tree, rice straw, wheat straw, corn and sorghum straw, bamboo pole, reed and various grass.

In the present invention, the short plant fiber used has a length of 1 to 20 mm (millimeter), preferably 4 to 12 mm, and most preferably 3 to 9 mm. The diameter of the fiber is not critical, but it is preferably from 0.01 to 0.1 mm. The particle size of the plant fiber powder is generally from 10 to 100 mesh, preferably from 20 to 80 mesh, most preferably from 40 to 70 mesh, and about 30 mesh in an Embodiment Examples. The short plant fiber and plant fiber powder can be obtained from the plants stated above by a method well known to the skilled in the art.

The amount of the short plant fiber used in the foamable plant fiber composition of the present invention is in a range of from 6.8 to 12.4 percent by weight, the amount of plant fiber powder is in the range of from 6.2 to 17.0 percent by weight, based on the total weight of the composition. The amount used thereof can be varied in the above range depending on the desired use.

The suitable gelling material used in the present invention can be selected, for example, from the group consisting of starch, gelatin, alginate, polyvinyl alcohol, and the modified starch composed of starch and one or more gelling material mentioned above other than starch. Starch is preferred. The advantage of the present invention is that the foamed material and article with excellent mechanical property can be obtained by only using the pure starch as gelling material without adding the expensive gelling material such as polyvinyl alcohol, alginate, etc., thus the cost is sharply reduced. However, it is also possible to use modified starch as gelling material, i.e. adding a small amount of polyvinyl alcohol or alginate to further improve the mechanical strength. This is also included in the scope of the present invention.

The amount of the gelling material used in the foamable plant fiber composition of the present invention is in the range of from 8.5 to 12 percent by weight, based on the total weight of the composition.

There is no limitation on the foaming agent used in the present invention as long as it is poisonless and harmless. Examples of the foaming agent are $NaHCO_3$, $NH_4HCO_3$ or the like. The use amount of the foaming agent may be in the range of from 0.4 to 0.7 percent by weight, based on the total weight of the composition.

If necessary, a small amount of aids may be used in the present composition to improve the gelling property of the colloid. The aids can be, for example, alum, borax or the like. If used, the amount of the aids can be from 0.8 to 1.3 percent by weight, based on the total weight of the present composition.

In preparing the foamable plant fiber composition of the present invention, the above mentioned amount of gelling material is added to an appropriate amount of water, then the resultant mixture is stirred thoroughly while heating (for example, heating in water bath), after a semi-transparent colloid is formed, the pH value is adjusted to neutral, and short plant fibers, plant fiber powder, foaming agent and (if necessary) ards are added, stirring and kneading is continued until the mixture is homogeneous. Thus, the foamable plant fiber composition of the present invention is obtained.

The biodegradable foamed material is obtained by foaming the foamable plant fiber composition stated above by any foaming process and removing the water by drying. The biodegradable foamed shaped article of the present invention is obtained when the foaming is carried out in a mould. The foaming process is well know to the skilled in the art, such as heating in a mould, etc.

After foaming, the resultant foamed material or article must be dired to remove the residual water. The water content in the biodegradable foamed material or article of the present invention is not more than about 10 percent by weight, based on the total weight of the foamed material or article. The drying process is well known to the skilled person in the art, such as drying in an oven, drying under reduced pressure or the like.

According to the needs, the foamable plant fiber composition can be made into various biodegradable shaped articles, including, for example, fast food dinner-pail, various cushioning material, exterior packaging material, various decorating partition boards and instrument shell, particularly fast food dinner-pail and cushioning material.

BEST MODE FOR CARRYING OUT THE INVENTION

The following is an Embodiment Example which is to illustrate the present invention, and should not be considered as any limitation to the present invention. The skilled person in the art may make various variations and changes to the present invention after reading the specification and claims, which should be included in the spirit and scope of the present invention.

EXAMPLE

The fiber of rice straw with length of 4 to 12 mm is used as the short plant fiber, the fiber powder of rice straw with particle size of 50 mesh is used as the plant fiber powder, edible or industrial starch is used as the gelling material, $NaHCO_3$ is used as the foaming agent, alux is used as the aids, the use amount of them is shown in the following:

| Raw material | Parts by Weight |
| --- | --- |
| Short fiber | 40 |
| Fiber powder | 70 |
| Starch | 50 |
| Water | 390 |
| $NaHCO_3$ | 2.5 |
| Alux | 5 |

The starch is added to the water at first, the mixture is heated to a temperature of about 60° C. while stirring, after the starch has become a paste and a semi-transparent colloid is formed, the heating is stopped and add $NaHCO_3$ and alux, after they are dissolved by stirring, the short fiber and fiber powder of rice straw are added. The mixture is kneaded thoroughly until it is homogeneous. Thus, a foamable plant fiber composition of the present invention is obtained.

The composition is divided into several parts and put in a mould preheated to a temperature of 150° to 200° C., and close the mould at once to foam the composition, open the mould 2 to 3 minutes later, the article is removed from the mould and dried for 20 minutes at 120° C., thus a biodegradable foamed shaped article of the present invention is obtained.

COMPARATIVE EXAMPLE

A foamed shaped article for comparison is produced following the procedure of the Example, except that 1 to 3 mm long fibereous rice straw is used to replace the short fiber and fiber powder of rice straw, and a mixture of starch and a small amount of alginate is used as gelling material to replace the starch.

The broken strength of these two shaped articles is determined according to GB 6545-86 (CN) Standard Method. The shaped article produced in the Example has a broken strength of 407 Kpa which is equivalent to that of a single-layer corrugated paper board, and is higher than that of polystyrene. The comparative shaped article has a broken strength of 311 kPa.

The density of the shaped article of the present invention determined by GB 8303-86 (CN) Standard Method is about 0.28 g/cm$^3$.

The foamable plant fiber composition of the present invention have a good processsability when moulded into articles, it can be moulded continously like foamed plastics, and thus suitable for mass industrial production. As the composition contains foaming agent and water, a lot of gas and steam sent out during foaming and moulding create a certain degree of pressure in the mould, which will greatly improve the filling of the material in the mould. In addition, a large number of pores are formed within the finished article, therefore, the article is light and consumes less raw materials. Meanwhile, a kind of dense and smooth film will create on the shaped article's surface when moulded, which will give a smooth and favorable appearance to the article. Therefore, the foamable composition of the present invention can replace the plastics and can be made into various articles according to needs, the finished article's price is only one fifth that of the article made from plastics.

The biodegradability and toxicity of the biodegradable formed material and article of the present invention were evaluated according to the method disclosed in Venitt, S, Crofton-Sleigh, C. and Forster, R., Bacterial Mutation Assays Using Reverse Mutation, Mutagenicity Testing—a Practical Approach (Venitt, S. and Parry. J. M., eds.) Oxford, Washington, D.C., 1984, pp 45–98. The degradation tests using cellulase or microorganisms show that the foamed material and article of the present invention is biodegradable. The toxicity tests show that the present material and article are harmless.

According to the present invention, it is possible to prepare the foamed article only using starch as the gelling material, without the need to adding other expensive gelling materials, thus, the cost of the article is sharply decreased.

What we claim is:

1. A foamable plant fiber composition used for preparation of a biodegradable foamed material and shaped article, characterized in that it is made from the following components by the following process:

a) from 6.8 to 12.4 percent by weight of short plant fiber,
   b) from 6.2 to 17.0 percent by weight of plant fiber powder,
   c) from 8.5 to 12.0 percent by weight of gelling material,
   d) from 60.0 to 72.0 percent by weight of water,
   e) from 0.4 to 0.7 percent by weight of foaming agent, and, if necessary
   f) from 0.8 to 1.3 percent by weight of aids;

said process comprises adding the gelling material to water, heating the resultant mixture while stirring, adjusting the pH value to neutral after a semi-transparent colloid is formed, and adding the short plant fiber, the plant fiber powder, foaming agent, and if necessary the aids, then stirring and kneading thoroughly until the mixture is homogeneous.

2. The plant fiber composition as claimed in claim 1, wherein said plant fiber is selected from a group consisting of the fiber of various kinds of tree, rice straw, wheat straw, corn or sorghum straw, bamboo pole, reed and grass.

3. The plant fiber composition as claimed in claim 1, wherein said short plant fiber has a length of 1 to 20 mm, said plant fiber powder has a particle size of 10 to 100 mesh.

4. The plant fiber composition as claimed in claim 3, wherein said short plant fiber has a length of 4 to 12 mm, said plant fiber powder has a particle size of 20 to 80 mesh.

5. The plant fiber composition as claimed in claim 4, wherein said short plant fiber has a length of 3 to 9 mm, said plant fiber powder has a particle size of 30 mesh.

6. The plant fiber composition as claimed in claim 1, wherein said gelling material is selected from a group consisting of starch, gelatin, alginate, polyvinyl alcohol and modified starch composed of starch and one or more gelling material mentioned above other than starch.

7. The plant fiber composition as claimed in claim 6, wherein said gelling material is starch.

8. A biodegradable foamed material obtained by foaming the plant fiber composition as claimed in claim 1 by any foaming process.

9. A biodegradable foamed shaped article obtained by foaming and moulding the plant fiber composition as claimed in claim 1 by any foaming moulding process.

10. The shaped article as claimed in claim 9 which is fast food dinner-pail, various cushioning materials, exterior packaging case, decorating partision board or instrument shell.

11. The shaped article as claimed in claim 10 which is fast food dinner-pail, or various cushioning materials.

* * * * *